United States Patent
Yip

(10) Patent No.: US 9,985,935 B2
(45) Date of Patent: May 29, 2018

(54) SYSTEMS AND METHODS FOR SECURE ONLINE COMMUNICATION

(71) Applicant: Tit Yu Yip, Hong Kong (HK)

(72) Inventor: Tit Yu Yip, Hong Kong (HK)

(*) Notice: Subject to any disclaimer, the term of this patent is extended or adjusted under 35 U.S.C. 154(b) by 140 days.

(21) Appl. No.: 15/208,792

(22) Filed: Jul. 13, 2016

(65) Prior Publication Data

US 2018/0019982 A1    Jan. 18, 2018

(51) Int. Cl.
H04L 29/06 (2006.01)
H04L 9/08 (2006.01)
H04L 9/00 (2006.01)
H04L 9/06 (2006.01)
H04L 12/58 (2006.01)

(52) U.S. Cl.
CPC .......... *H04L 63/0435* (2013.01); *H04L 9/008* (2013.01); *H04L 9/0643* (2013.01); *H04L 9/083* (2013.01); *H04L 51/04* (2013.01); *H04L 63/0485* (2013.01); *H04L 63/062* (2013.01)

(58) Field of Classification Search
None
See application file for complete search history.

(56) References Cited

U.S. PATENT DOCUMENTS

| 8,407,482 B2 * | 3/2013 | Ghosh | H04L 29/12594 713/189 |
| 2008/0123850 A1 * | 5/2008 | Bhatnagar | H04L 63/0428 380/259 |
| 2014/0032681 A1 * | 1/2014 | Jain | G06F 15/16 709/206 |
| 2016/0014059 A1 * | 1/2016 | Rathod | H04L 12/1818 715/752 |

* cited by examiner

*Primary Examiner* — Amir Mehrmanesh

(57) ABSTRACT

Systems and methods safeguarding online chat privacy via Uncode keywords encoding that are likely to carry the intent of messages within a conversation between two or more parties. Input of a set of keywords is obtained in chronological order from a conversation between two or more parties for the computing of hash values based on a word's influence on subsequent words in the conversation, and generating a ranked order of the keywords from highest to lowest hash value corresponding to keywords that are likely to carry intent of a conversation. Automatic deletion of messages on each participating devices after every transaction enhances privacy and security. A different Unicode cipher table can be used for each message, device, group, or user, where homomorphic encryption is used for protection of the Unicode cipher table by not exposing encryption keys in unencrypted states when sharing among devices.

7 Claims, 10 Drawing Sheets

| Original chars | Mapped chars for encoding from unicode table |
|---|---|
| ... | ... |
| A | ẁ , ʕ , Ɽ , ㅠ ... |
| B | £ , ñ̊ , ɖ , ɰ ... |
| C | ʃ , ڶ , ټ , ځ ... |
| D | † , ‡ , ‰, ₩ ... |
| , | ض , ⚙ , .... |
| . | Ψ , Θ, ... |
| ... | ... |

Fig 6. Unicode chars encode table example

| First time encoded chars | Mapped chars for encoding from unicode table |
|---|---|
| ... | ... |
| ۺ | A , B, C ... |
| £ | D, E, F ... |
| † | H, I, J ... |
| ض | ... |
| , | ... |
| . | ... |
| ... | ... |

Fig 10. Second time Unicode chars encode table example

SYSTEMS AND METHODS FOR SECURE ONLINE COMMUNICATION

FIELD OF THE INVENTION

The present invention is generally related to online messaging and privacy. Specifically, this invention relates to online privacy protection.

BACKGROUND OF THE INVENTION

When multiple users communicate by exchanging messages online, traces of messages left on end devices are susceptible to siphoning by unauthorized third parties, either from accessing communication devices or a chat server to carry out forensic audit and investigations.

User messages may involve rich data types, including but not limited to, plaintext, pictures, video, audio, and markups.

User messages may also comprise of send timestamp, receipt timestamp, sender personal identifying data, recipient personal identifying data, sender device tracking data, recipient device tracking data, sender online preferences, and recipient online preferences.

User messages may also comprise of sensitive data that require authorization from data subject other than the sender and the recipient, where such sensitive data may include password, third party identifying data, and trade secrets.

Traces of messages left on end devices are susceptible to both internal and external threats, including but not limited to: stolen or lost devices, online tracking companies, Trojan horses programs, and accidental forwarding of confidential messages by the user.

User messages may also include multiple languages, and may span across a network of multiple countries and jurisdictions. User messages may be encrypted or may be encoded.

A common weakness with encoding techniques is frequency-based attack by sampling chat messages over a long period of time to obtain some of the most frequently occurred encoded values representing letters, which are then translated into a small finite dataset of the most frequently used alphabets in the language of English. Based on the dataset, the encoding scheme can very easily be decoded by applying known speech patterns of the language English.

The frequency-based attack can further compromise a conversation by means of another technique, which samples chat messages over a long period of time to identify frequently occurred phrases. Commonly used phrases that are trending in points of time tend to be very limited in numbers when sampling among all English speaking populations. The size of the dataset can even be further reduced when the social background of speakers engaged in a conversion is known, as there is a natural tendency to reuse a very small subset of vocabularies and phrases specific to a circle or profession, thereby increasing the success rate of a frequency attack.

In this application, the inventor has improved upon previous techniques by developing methods and apparatus for the protection of privacy of both end user and the real party of interest, such as an employer and a data subject. Techniques are described that provide enhanced protection against frequency attack that are either alphabets-based, or phrases-based, or both. Further, techniques are described to prevent leakage of conversation in cases of forensic discovery, for example when required by laws or by force.

SUMMARY OF THE INVENTION

Systems and methods are provided in which online conversations are protected at an online communication system including a homomorphic key server, a chat server, a plurality of chat devices registered at the homomorphic key server for group chat. A Unicode cipher table is generated specific to each chat device by obtaining an encryption key from the homomorphic key server for encrypting the Unicode cipher table. All traces of conversation, including hash values for the use of the Unicode cipher table, are erased from the chat memory when a chat device is disconnected from the chat server. Encoded messages communicated within a group are stored in a server memory of the chat server and is never stored in any readable medium on either the chat server or any devices. In addition, device keys and specific Unicode cipher table keys are never exposed in unencrypted states when shared among devices.

In accordance with one embodiment of the present invention, a method for using word segmentation and classification techniques in combination of machine learning algorithms to determine hash value based on relevance to intent of a conversation. In accordance with another embodiment of the present invention, a random algorithm seeded with sufficient entropy is used for generation of the hash value.

BRIEF DESCRIPTION OF THE DRAWINGS

FIG. 6 is a sample Unicode cipher table for use of encoding and decoding of encoded messages.

FIG. 10 is a sample second time Unicode chars encode table.

DETAILED DESCRIPTION OF THE INVENTION

Figure 1:
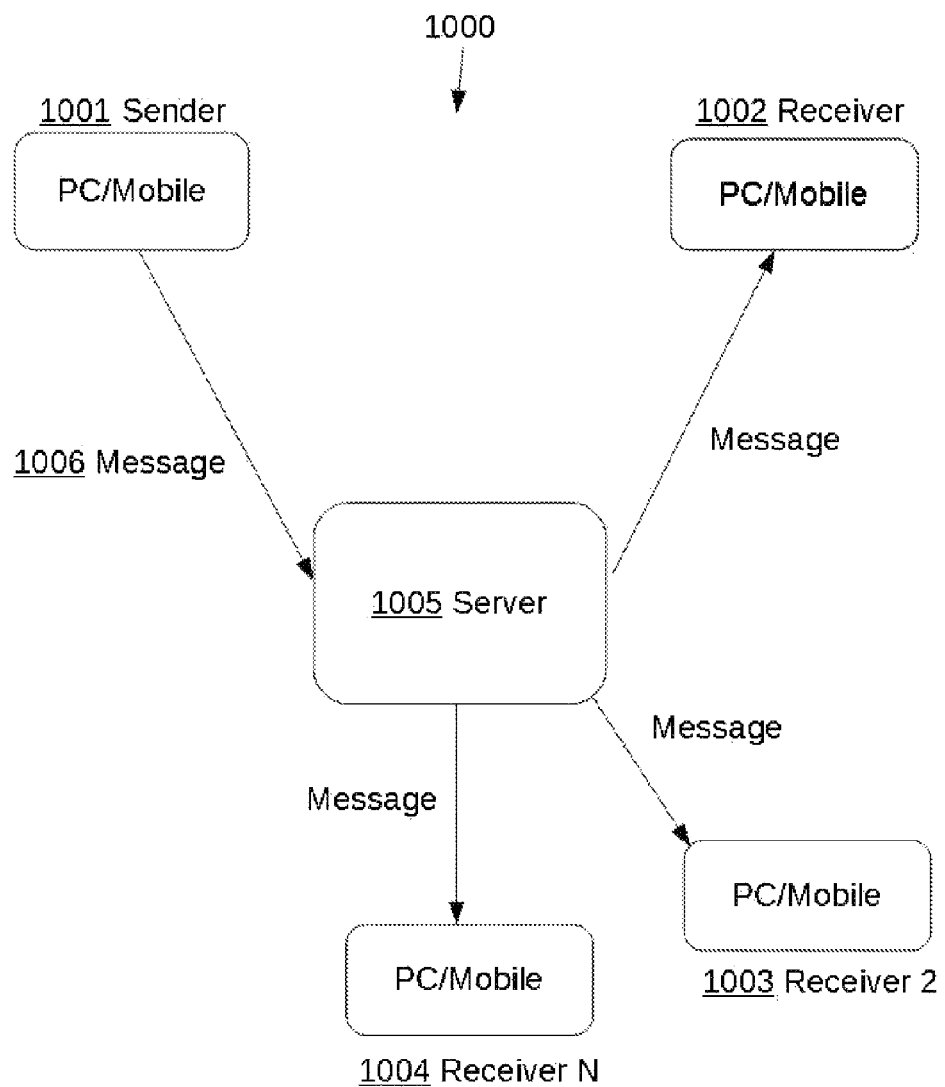
FIG. 1 is a schematic diagram of multiple chat devices communicating via a chat server.
Figure 2:
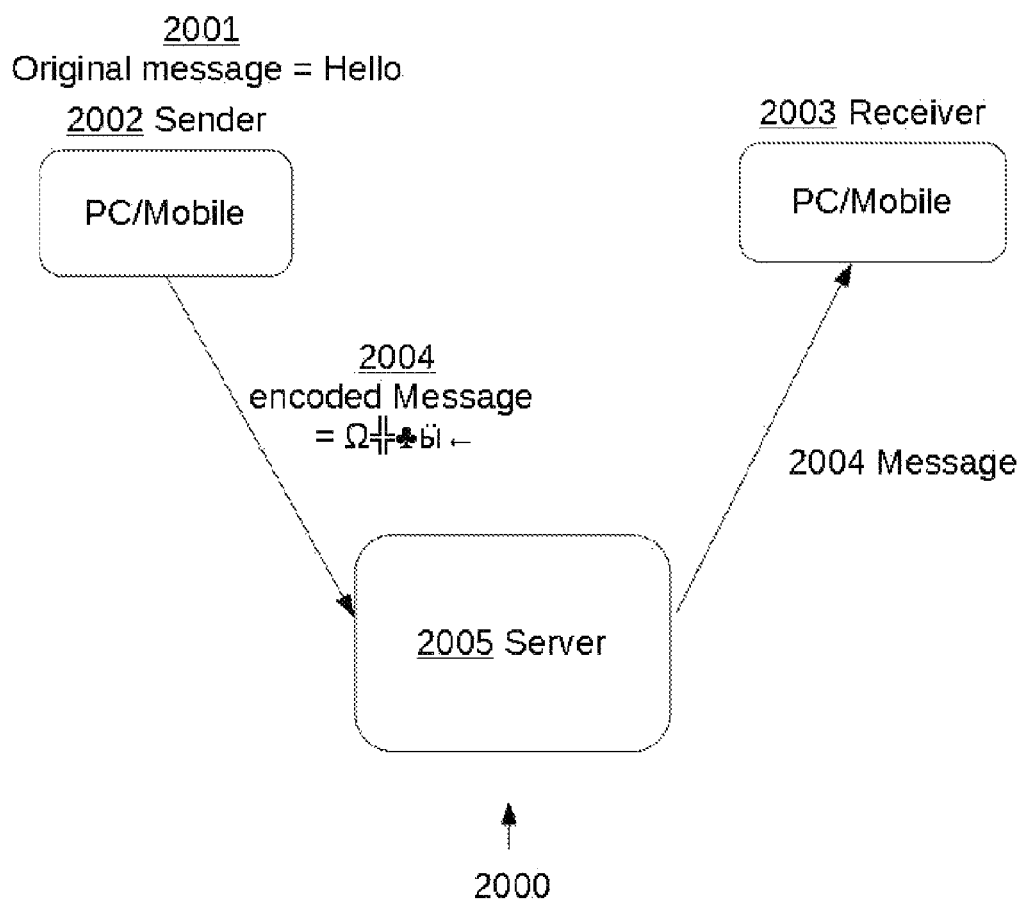
FIG. 2 is a schematic diagram of a chat device encoding a chat message for sending to a chat server for reading by other devices in a chat group.
Figure 3:
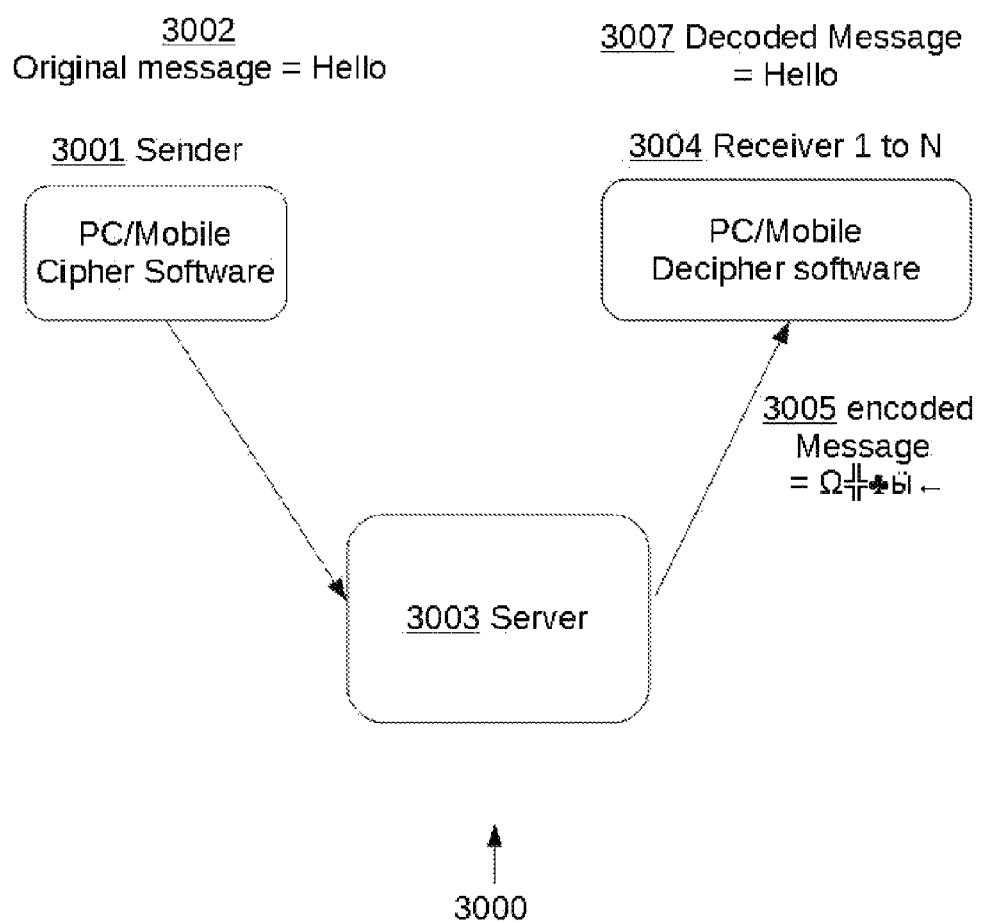
FIG. 3 is a schematic diagram of a receiving device decoding a message retrieved from a chat server for reading.
Figure 4:
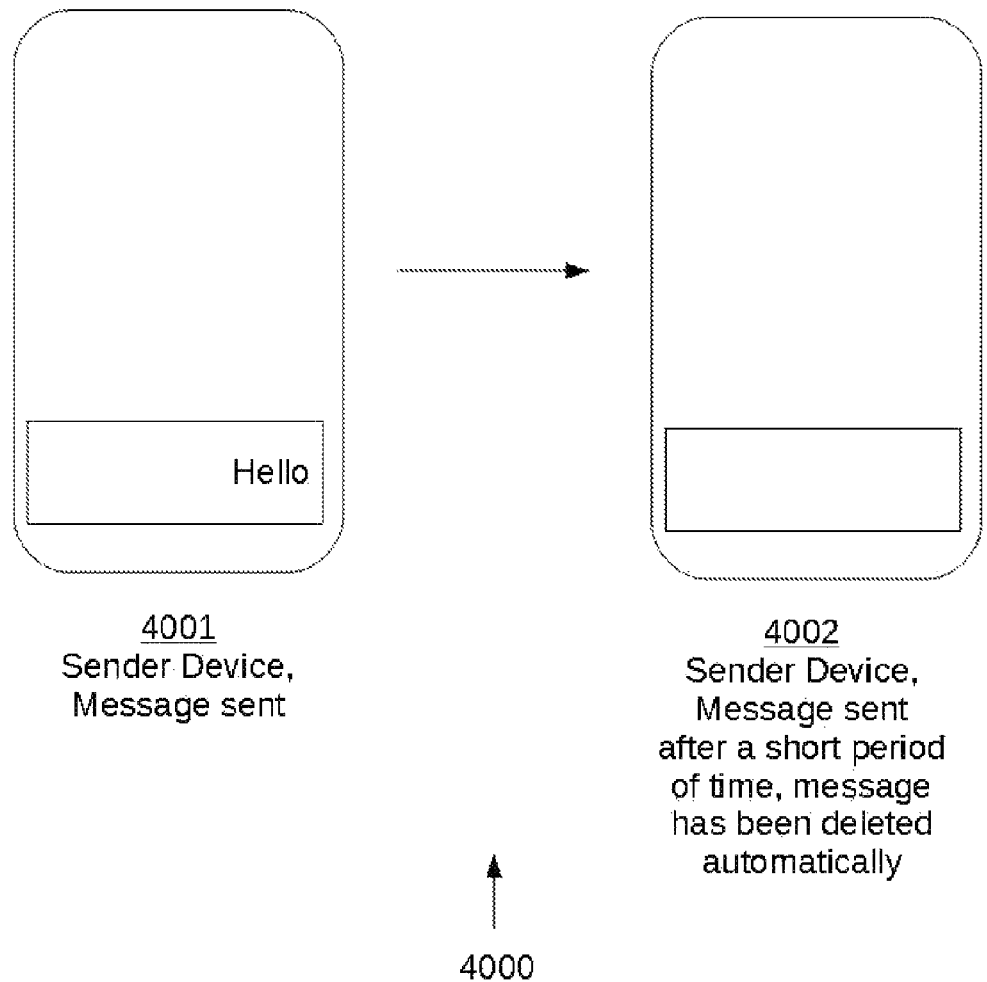
FIG. 4 is a schematic diagram of a chat device automatically deleting a message after sending of the message.
Figure 5:
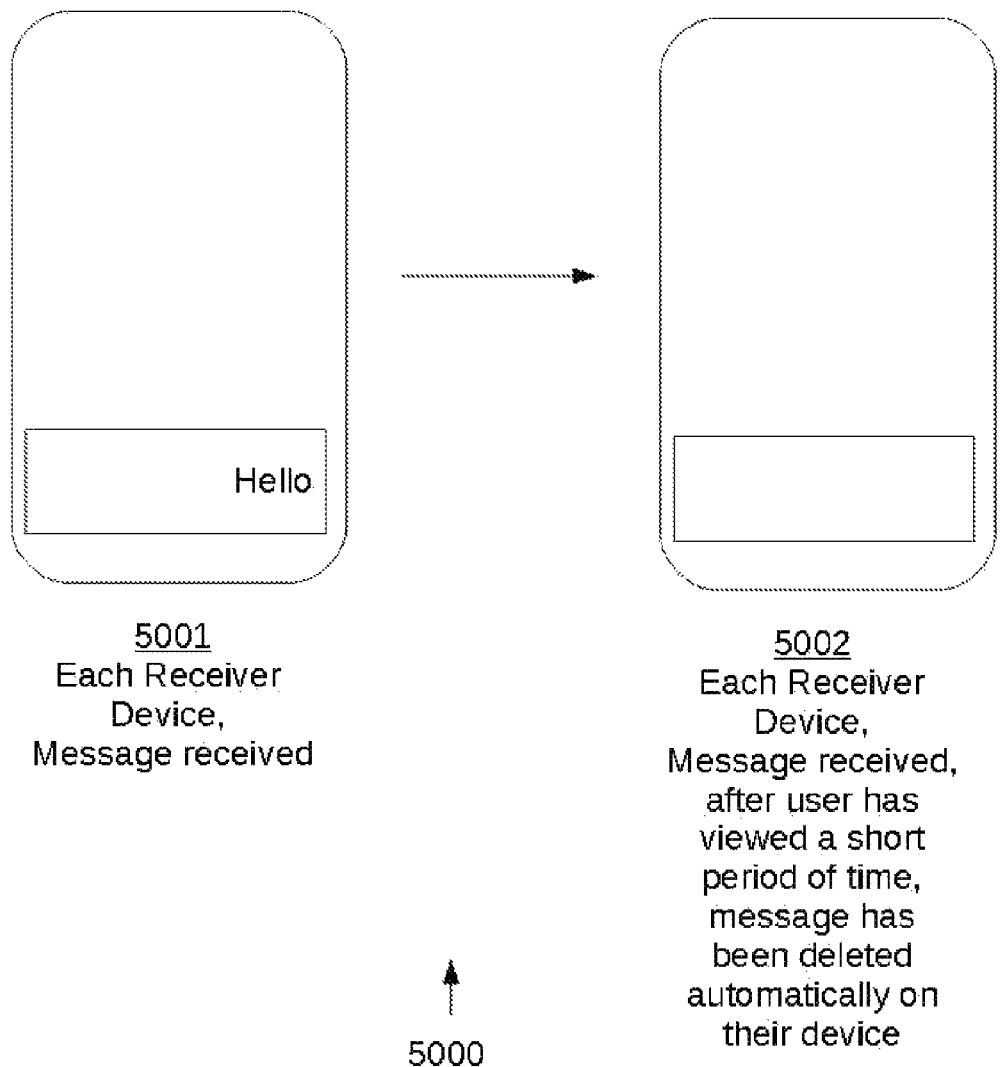
FIG. 5 is a schematic diagram of a chat device automatically deleting a received message after reading of the message.
Figure 7:
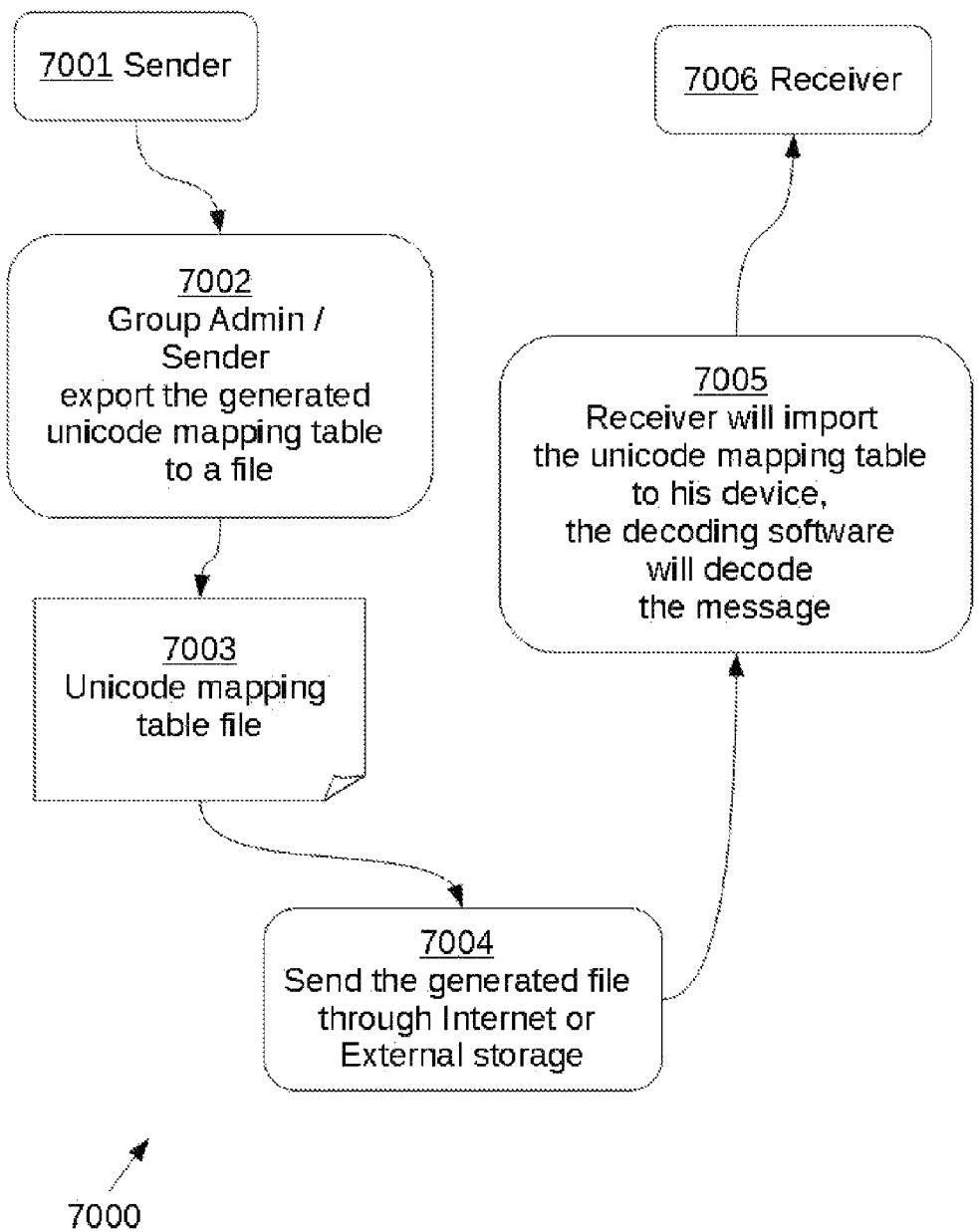
FIG. 7 is a schematic diagram of a receiving device importing a Unicode cipher table file originated from another device.
Figure 8:
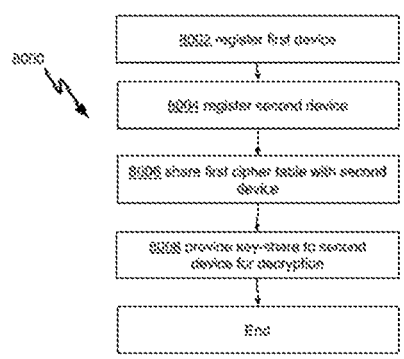
FIG. 8 is a flow diagram of a device receiving a key-share from a homomorphic key server for the decryption of a Unicode cipher table.
Figure 9:
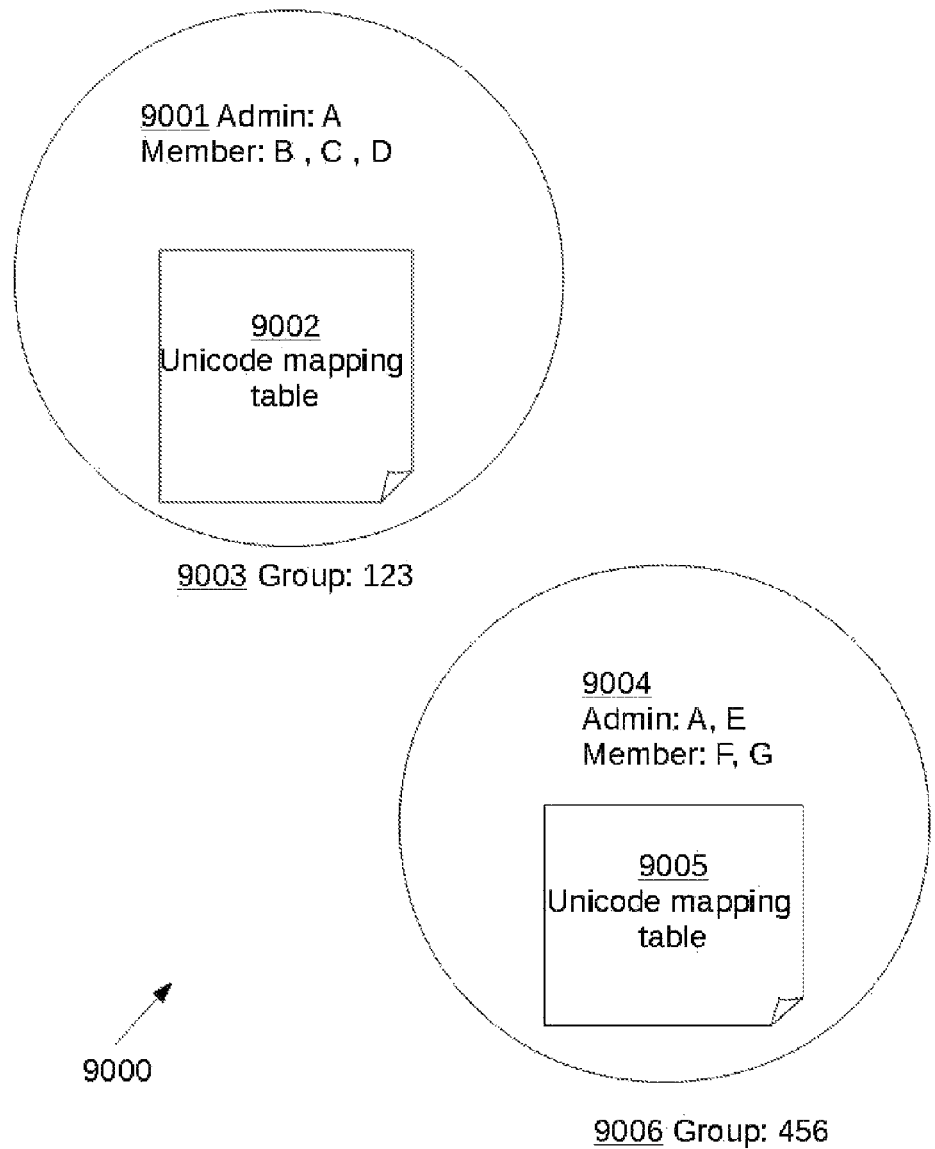
FIG. 9 is an illustration of two chat groups having different members while sharing a common admin.

The present invention provides methods and systems for protection of online communication privacy between device users, data subjects, and real parties of interest.

The invention comprises of a chat server for chat devices to exchange chat messages over a trusted communication network.

A registered user may log in to a trusted communication network from one or more endpoints, including but not limited to, portable mobile devices and desktop computers.

A Unicode cipher table masking technique is used for encoding messages communicated over a network between endpoint devices. Each message is encoded according to a translation determined by a Unicode cipher table that is in private possession of an originating user. On the other hand, a recipient obtains the Unicode cipher table from the originating user for the decoding of the received message.

In one embodiment of the present invention, the communication of Unicode cipher tables and messages are transmitted in a direct point-to-point connection between an originating user and a receiving user. Each message is sent directly to the receiving user, who decodes the message by means of using the Unicode cipher table obtained from the originating user. In another embodiment, the technique can also be employed in a chat group of a plurality of users, where each of the users registers with a central chat server in order to obtain authorization to access messages originated from other users in the same group. In this case, each message is sent to the group hosted on the chat server waiting to be read by group members. Each group member obtains a Unicode cipher table from the sender of the message. In either of the embodiments, whether it is communicating via a direct point-to-point connection or communicating with a group, exchange of Unicode cipher tables can be carried out either via direct in-person contact, mailing of hard copies, verbal communication, or electronically encrypted formats.

When an originating device sends a message, the originating device automatically deletes any traces of the communication upon receiving an acknowledgement from the receiving device confirming delivery of the message. In the embodiment of a direct point-to-point communication, the acknowledgement is sent directly from the receiving device. In the embodiment of a chat group, the acknowledgement is sent from the chat server. The chat server in turn deletes all traces of communication after receiving acknowledgements from all group members confirming their reading of the message. The message is stored in memory only and will never be stored in any readable medium of the server. This enhances security to safeguard the chat server from breach or attack.

A receiving device decodes a received message by means of using a Unicode cipher table obtained from the originating user of the message, and sends back an acknowledgement to the source of transmission of the message, which is the sending device in the case of a direct point-to-point connection, or the chat server in the case of a chat group. The receiving device automatically deletes all traces of communication after reading of the message independently and separately of the transmission of acknowledgement. This enhances security and privacy even in the case of failure of the transmission due to network connection problems or unavailability of the originating device. Messages are temporarily stored in the chat memory of the receiving device and will not be stored on any readable medium of the device.

In one embodiment of the invention, a separate encoding and decoding device is used to work with chat devices for the storage and application of Unicode cipher tables. In another embodiment, this feature is included in a chat device itself.

In the case of forwarding messages originated by a first device by a second device to a third device, the second device always deletes all traces of communication with the first device before the forwarding. Subsequently, encoding of the plaintext message is carried out in the chat memory of the second device, followed by sending the encoded message to either the chat server or directly to the third device. A Unicode cipher table in private possession of the second user is used in the encoding of the message, resulting in enhanced privacy control as even the first user who originates the first message cannot access the message that is being forwarded without obtaining specific authorization from the second user.

Although an encoded message is closely coupled to a Unicode cipher table that is used for the encoding, the two can be obtained separately and independently, and they indeed are usually. In one embodiment of the present invention, a Unicode cipher table is provided to a receiving user after a conversation has already ended for purposes of computer forensic.

In a preferred embodiment of the present invention, a homomorphic key server is used to ensure secure safeguarding and access control to a Unicode cipher table by authorized devices only. Registration of a pair of device keys 8002, 8004 with the key server provides authorized access to shared Unicode cipher tables. The originating device has a master key denoted as K∈G for the encryption of the Unicode cipher table. The total number of receiving devices is denoted as n∈N, while the security parameter is denoted as k∈N. A first chat device registers a Unicode cipher table with the key server, designated for sharing with a second registered chat device 8006. The key server generates a new key for the first Unicode cipher table, performs homomorphic operation on the first table key in combination with the pair of device keys to arrive at a homomorphic key-share 8008 used for encrypting of the table itself. Security is enhanced as multiple devices can share access to a Unicode cipher table without exposing any of the device keys or Unicode cipher table key in unencrypted states over the wire across network. In other words, the second chat device can have access to the first Unicode cipher table without ever knowing the first chat device key and the Unicode cipher table key, as they are always fully encrypted when in storage at the second chat device. Further, the first chat device can readily share access with additional devices by registering additional device key pairs at the key server at any point of time during a conversation, even after the conversation has begun or ended. The key server homomorphically encrypts the first device key differently for each designated device to enhance protection against breach or attack, even resulting from stolen devices. The homomorphic encryption technologies are well known in the art, and will not be described in detail herein.

An encoding operation makes use of an "Unicode multiple mapping" technique, in which a Unicode cipher table, aka a mapping table, exists to define mappings between one individual Unicode source to a plurality of potential Unicode targets. The total number of Unicode targets of any given Unicode cipher table is driven by user configurations. The source Unicode set includes the first 95 Basic Latin Unicode alphabets and punctuations ranging from U+0020 to U+007E. The target Unicode set can be defined in one or more languages, where the specific choice of languages and Unicode targets are also user configuration driven. When encoding a chat message, a Unicode cipher table is used to determine a specific mapping for each individual source Unicode in the message into a specific target Unicode in a foreign language, which is a different language than the native language the massage is written in. Selection of a mapping contained within a given Unicode cipher table is determined according to a hash value. In one embodiment of the present invention, a random number generator is used to generate the hash value, with the intention to randomize each selection of a target Unicode, thereby reducing the attack vector of frequency-based attacks. To further enhance security protection, punctuations are also encoded and randomized to mask the beginnings and ends of individual words, clauses, and sentences, resulting in even stronger protection from frequency-based attacks, because even when a same sentence is repeatedly encoded two different times to obtain a first encoded value and a second encoded value can result in different encoded values due to the use of randomly generating different hash values for each time of the encoding. As such, this further enhances protection from frequency attacks that harvest frequently reoccurring phrases.

In another alternative embodiment, the selection of target Unicode is carried out based on a Unicode specific scoring method instead of strict randomization. A given sentence is dissected into keywords, where the keywords are ranked by a score for each of the keywords that can also include two sub-scores. The first sub-score is computed based on the one or more Unicode constituents of the keyword. Each Unicode is assigned a score based on its number of occurrences in the chat message as a whole and how often the Unicode occurs in general in the keyword corpus. In at least one embodiment of the invention, the first sub-score can be the sum of the individual constituent scores. The second sub-score for the keyword is computed based on the keyword's similarity with the subsequent keywords in the conversation as a whole. This takes into account of trending keywords in the history of a conversation, by taking into account of messages originated from users in addition to the user of the single active device. The final score for the keyword is computed as a linear combination of the two sub-scores. Accordingly, the keywords are ranked in decreasing order of score.

In some alternative embodiments, the scoring step can be implemented in connection with word segmentation and classification techniques currently exist in the art, which begins by selecting a large amount of chat message fragments, followed by subsequent segmentation. For example, after applying of a word segmentation, a chat message containing only one sentence "Let's have a meeting tomorrow" can be transformed into a corresponding segmentation of (Let's/have/a/meeting/tomorrow). The segmentation can subsequently be processed further by applying machine learning algorithms that are commonly known in the art, such as the Support Vector Machine algorithm, or the Maximum Entropy algorithm, so that a degree of relevance is calculated for each individual word in relationship to the intent of a conversation as a whole. This degree of relevance can then be used as a basis of weighted grade assigned to each keyword as a contributing factor to the scoring. The word segmentation and classification techniques, as well as the machine learning algorithms are well known in the art, and will not be described in detail herein.

Alternatively, a set of keywords can also be manually given a weighted grade by a user. That is, the user can provide in a device configuration a list of keywords that are likely indicative of intent, along with weights, as part of the user's preferences. Here, a given weight associated with each keyword characterizes a probability that the keyword can be an intent-carrying keyword in a given group, profession, or social circle.

Once a weighted grade for each Unicode is assigned, a weight for each containing keyword can be calculated. An example method for calculating weight of a containing keyword is summation of weights of all Unicode constituents in the keyword. Alternatively, the weight of a keyword can also be determined by taking the maximum constituent weight that occurs in a single keyword.

As detailed herein, an aspect of the invention includes the use of features between keywords that have a relation with a higher set of words. For example, the keyword "mother" can be related with "woman" and/or "female." As used herein, a feature is a word or a phrase, and a set of features is computed automatically given a set of conversations. A relationship between words is driven by how likely it is that a term "y" will occur given that "x" has already occurred. By way of illustration, if "mother" has already occurred in a chat, it may be likely that the chat will include a word such as "woman," "female," etc. In at least one alternative embodiment of the present invention, a word's influence on subsequent keyword in the same conversation is taken as a factor of scoring that is intent driven, based on the number of times the word and those related words subsequently occurs in the conversation. In at least one embodiment of the invention, the scoring is also based on similarity of words, phrases and/or features between keywords in the conversation. Similarity of words can be based, for example, on a cosine similarity measure. Features can include words that have a causal relation with a higher set of words. In yet at least one other embodiment, a ranked order of the utterances is generated from highest to lowest hash value, wherein the highest hash value corresponds to the keyword which is most likely to carry intent of a conversation. Additionally, at least one embodiment of the invention includes selecting the top N keywords from the ranked order representative of the conversation.

Additionally, as detailed herein, at least one embodiment of the invention can include a weight scoring module to provide frequency based scoring on each word in the at least one chat message, thereby generating a weight for each word, wherein the frequency based scoring measures the frequency of each word throughout the at least one chat message, calculating a weight for each keyword in the conversation to generate weighted grades by summing the weights of each Unicode constituent in each utterance. Such an embodiment can also include comparing at least one weighted Unicode to pre-existing example Unicode carrying the intent of a chat message to determine a relevancy score for the at least one weighted Unicode based on similarity to the example Unicode, and generating a ranked order of the at least one weighted Unicode from highest to lowest relevancy score, wherein the highest relevancy score corresponds to the Unicode which is most likely to carry intent of the chat message. The word weight scoring module can include a list of words likely indicative of chat message intent along with a weight associated with each keyword, wherein the weight characterizes probability that the word is a word carrying intent of a chat message.

Identification of the user profile information may be used to gather information about the user(s) and generate one or more analytic profiles for the user(s). The information from these user profile(s) may be analyzed to determine various characteristics of the user chat patterns including, for example, the user's choice of words, writing style, vocabulary/dictionary of terms, and the like. For example, the user's profile may specify the user's home location via GPS readings, birthplace, or the like, including street address, state or region, country, and the like. From this information, user's chat style may be determined, e.g., a specific style if the user is located or was born in Southern India, Australian English writing style if located in Australia, Russian, American, South Texan style if located in South Texas, etc. A user's chat style, e.g., idiomatic phrases, etc., may be determined from an analysis of the user's chat history and usages, e.g., the user choice of separators after every two sentences, uses the non-word " . . . ," has a particular style of inflection, or other repetitive chat writing style. The user profile may identify the user's profession or other interests which may provide an indication of the types of words that the user prefers, e.g., a doctor or nurse may utilize medical terms while an attorney/paralegal may utilize legal terms.

A recipient device will import the "Unicode multiple mapping" table for decoding. Since the mapping can be done via lookups in a finite set of character mappings, the operations can be carried out efficiently. An encoded chat message is protected from man-in-the-middle attacks by means of separation of utilizing two separate channels for transmissions of the Unicode cipher tables and the chat messages. Even if an encoded chat message is intercepted, the chat message cannot be readily decoded without the availability of the corresponding Unicode cipher table from the originating user.

A Unicode cipher table can also be of nested structure of more than one level. A first level of Unicode cipher table provides translation of a source Unicode to a first set of one or more Unicode targets, while a subsequent level of Unicode cipher table provides translation of the one or more Unicode targets in the first set to a second set of one or more Unicode targets. Each translations and languages are user-specified in each of the Unicode cipher tables.

When a receiving device receives an encoded message, a Unicode cipher table is used to determine the number of nesting levels. The number of nesting levels is not included in individual chat messages for enhanced protection from interception from man-in-the-middle attacks.

An originating device may specify a different Unicode cipher table for each participating group. If a receiving device participates in multiple groups that are in common with the originating user, the receiving device may obtain multiple Unicode cipher tables from the same originating user for one or more specific groups and conversations.

The invention claimed is:

1. A privacy safeguarding method useful in encoding an online conversation by using hash values that are likely to carry the intent of a conversation, the method comprising:
   at an online communication system including a homomorphic key server, a chat server,
   a first chat device having a chat memory, and a second chat device registered at the homomorphic key server for communicating with the first chat device:
      generating a Unicode cipher table at the first chat device by obtaining an encryption key from the homomorphic key server to encrypt the Unicode cipher table;
      generating in the chat memory a hash value for the Unicode cipher table, wherein the generating:
         uses a word segmentation and classification technique to transform the chat message into a segmentation of keywords;
         applies a machine learning algorithm to the keywords to obtain an intent of the conversation as a whole; and
         calculates the hash value for each of the keywords based on a score of relevance to the intent;
      erasing the hash value from the chat memory when the first chat device is disconnected from the chat server;
      initiating a chat message at the first chat device, wherein the first chat device encodes the chat message by using the Unicode cipher table with the hash value to determine an encoded message;
      storing the encoded message in a server memory of the chat server;
      receiving the Unicode cipher table at the second chat device, wherein the second chat device obtains the homomorphic key from the homomorphic key server for decrypting of the Unicode cipher table; and
      obtaining the encoded message from the chat server at the second chat device, wherein
         the second chat device decodes the encoded message by using the Unicode cipher table, and
         the hash value is not known to the second chat device.

2. A method as in claim 1, further comprising:
   connecting the first chat device to the second chat device via a first transport;
   selecting the first transport from the group consisting of USB links, internet, postal mails, emails, computer readable medium, portable storage devices, and combination thereof; the first chat device communicating the Unicode cipher table to the second chat device via the first transport in a first transaction;
   connecting the first chat device to the second chat device via a second transport;
   selecting the second transport from the group consisting of USB links, internet, postal mails, email, computer readable medium, portable storage devices, and combination thereof, wherein the selection of the second transport is independent of the selection of the first transport; and the first chat device communicating the chat message to the second chat device via the second transport in a second transaction that is asynchronously independent of the first transaction.

3. A method as in claim 2, wherein the connecting the first chat device to the second chat device via a first transport comprises:
   an external encoding device coupling with the first chat device;
   an external decoding device coupling with the second chat device; and connecting the external encoding device to the external decoding device.

4. A method as in claim 1, wherein generating in the chat memory a hash value for the Unicode cipher table comprises determining at least one of an accent, a cadence, or a pattern of speaking based on at least one of home location information or birthplace location information stored in a user profile.

5. A method as in claim 1, wherein generating a Unicode cipher table at the first chat device by obtaining an encryption key from the homomorphic key server to encrypt the Unicode cipher table comprises determining a dictionary of words and corresponding weights that are commonly used in the conversation's history.

6. A method as in claim 1, wherein the generating in the chat memory a hash value for the Unicode cipher table comprises:
   obtaining an input of a set of keywords in chronological order from a conversation between two or more parties;
   computing a hash value of each keyword by capturing each keyword's influence on the subsequent keywords in the conversation based on the number of times the keyword subsequently occurs in the conversation, and wherein said computing is carried out by a scoring operation module executing on a hardware processor of a computing device; and
   generating a ranked order of the keywords from highest to lowest hash value, wherein the highest hash value corresponds to the keyword which is most likely to carry intent of the conversation, and wherein said generating is carried out by a distribution module executing on a hardware processor of the computing device.

7. A system useful in secure online communication, wherein hash values that are likely to carry the intent of a conversation are used as factors in encoding of conversation, the system comprising:
  a homomorphic key server;
  a chat server;
  a first chat device having a chat memory;
  a second chat device registered at the homomorphic key server for communicating with the first chat device; and
one or more programs, wherein the one or more programs are stored in the memory and configured to be executed by the one or more processors, the one or more programs including instructions for:
  generating a Unicode cipher table at the first chat device by obtaining an encryption key from the homomorphic key server to encrypt the Unicode cipher table;
  generating in the chat memory a hash value for the Unicode cipher table, wherein the generating:
    uses a word segmentation and classification technique to transform the chat message into a segmentation of keywords;
    applies a machine learning algorithm to the keywords to obtain an intent of the conversation as a whole; and
    calculates the hash value for each of the keywords based on a score of relevance to the intent;
  erasing the hash value from the chat memory when the first chat device is disconnected from the chat server;
  initiating a chat message at the first chat device, wherein the first chat device encodes the chat message by using the Unicode cipher table with the hash value to determine an encoded message;
  storing the encoded message in a server memory of the chat server;
  receiving the Unicode cipher table at the second chat device, wherein the second chat device obtains the homomorphic key from the homomorphic key server for decrypting of the Unicode cipher table; and
  obtaining the encoded message from the chat server at the second chat device, wherein
    the second chat device decodes the encoded message by using the Unicode cipher table, and the hash value is not known to the second chat device.

\* \* \* \* \*